US011873756B2

(12) United States Patent
Suzuki et al.

(10) Patent No.: US 11,873,756 B2
(45) Date of Patent: Jan. 16, 2024

(54) CONTROLLER AND CONTROL METHOD FOR INTERNAL COMBUSTION ENGINE

(71) Applicant: TOYOTA JIDOSHA KABUSHIKI KAISHA, Aichi-ken (JP)

(72) Inventors: Yuki Suzuki, Kariya (JP); Tomihisa Tsuchiya, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/301,256

(22) Filed: Apr. 17, 2023

(65) Prior Publication Data

US 2023/0332535 A1 Oct. 19, 2023

(30) Foreign Application Priority Data

Apr. 19, 2022 (JP) ................................ 2022-069002

(51) Int. Cl.
*F02B 47/02* (2006.01)
*F02B 75/12* (2006.01)

(52) U.S. Cl.
CPC ........ *F02B 47/02* (2013.01); *F02B 2075/125* (2013.01)

(58) Field of Classification Search
CPC .... F02B 47/02; F02B 2075/125; F02D 19/12; F02D 41/3041; F02M 25/025; F02M 25/03; F02M 25/028; F02M 25/022; F02M 25/00
USPC ............................................ 701/101; 123/25
See application file for complete search history.

(56) References Cited

U.S. PATENT DOCUMENTS 4,558,665 A * 12/1985 Sandberg ........... F02M 25/0225 123/25 J
9,945,310 B1 * 4/2018 McQuillen ........... F02M 35/104
10,247,140 B2 * 4/2019 McQuillen ............ F02D 35/027
2014/0366508 A1 * 12/2014 Ulrey ........................ F01N 3/04 60/274

FOREIGN PATENT DOCUMENTS

JP 2017218994 A 12/2017
JP 2018115608 A 7/2018

* cited by examiner

*Primary Examiner* — Hung Q Nguyen
*Assistant Examiner* — Anthony Donald Taylor, Jr.
(74) *Attorney, Agent, or Firm* — HAUPTMAN HAM, LLP

(57) ABSTRACT

A controller for an internal combustion engine is configured to execute: a pressure calculation process that calculates pressure of gas in a crank chamber based on a running state of the internal combustion engine; a first injection process that causes a water injection valve to inject a first injection amount of water when an intake valve is open; and a second injection process that causes the water injection valve to inject a second injection amount of water when the intake valve is closed. The controller is further configured to set a ratio of the first injection amount to a sum of the first injection amount and the second injection amount to a smaller value when the pressure is greater than or equal to a specified value than when the pressure is less than the specified value.

7 Claims, 3 Drawing Sheets

CONTROLLER AND CONTROL METHOD FOR INTERNAL COMBUSTION ENGINE

RELATED APPLICATIONS

The present application claims priority of Japanese Application Number 2022-069002 filed on Apr. 19, 2022, the disclosure of which is hereby incorporated by reference herein in its entirety.

BACKGROUND

1. Field

The present disclosure relates to a controller and a control method for an internal combustion engine.

2. Description of Related Art

Japanese Laid-Open Patent Publication No. 2017-218994 discloses an internal combustion engine and its controller. The internal combustion engine disclosed in this publication includes cylinders, an intake passage connected to the cylinders, and water injection valves located in the intake passage. The controller disclosed in this publication causes the water injection valves to inject water when the internal combustion engine is in a high-load running state. The water injected by the water injection valves flows into the cylinders through the intake passage and evaporates in the cylinders. When the water evaporates, the heat of vaporization lowers the temperatures in the cylinders.

In the technique of supplying water to the cylinders through the intake passage as disclosed in the above publication, the water that has reached the inside of the cylinders may collect on the wall surfaces of the cylinders. When the piston reciprocates with the water collecting on the wall surface of each cylinder, the water may enter the crank chamber as the piston slides relative to the wall surface of the cylinder. When the water that has reached the inside of the crank chamber evaporates, the pressure of gas in the crank chamber increases. Accordingly, as the amount of water that collects on the wall surface of the cylinder becomes larger, the pressure of the gas in the crank chamber may become excessively higher.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a controller for an internal combustion engine. The internal combustion engine includes: a cylinder; an intake passage including a connection port connected to the cylinder; a water injection valve configured to inject water into the intake passage; an intake valve configured to selectively open and close the connection port; and a crank chamber that connects to the cylinder and accommodates a crankshaft. A period from when the intake valve closes to when the intake valve closes again after opening is referred to as a single cycle. The controller includes processing circuitry configured to execute: a pressure calculation process that calculates pressure of gas in the crank chamber based on a running state of the internal combustion engine; a first injection process that causes the water injection valve to inject a first injection amount of water when the intake valve is open in the single cycle; and a second injection process that causes the water injection valve to inject a second injection amount of water when the intake valve is closed in the single cycle. The processing circuitry is configured to set a ratio of the first injection amount to a sum of the first injection amount and the second injection amount to a smaller value when the pressure is greater than or equal to a specified value than when the pressure is less than the specified value, the specified value being defined in advance.

Another aspect of the present disclosure provides a control method for an internal combustion engine. The internal combustion engine includes: a cylinder; an intake passage including a connection port connected to the cylinder; a water injection valve configured to inject water into the intake passage; an intake valve configured to selectively open and close the connection port; and a crank chamber that connects to the cylinder and accommodates a crankshaft. A period from when the intake valve closes to when the intake valve closes again after opening is referred to as a single cycle. The control method includes: calculating pressure of gas in the crank chamber based on a running state of the internal combustion engine; causing the water injection valve to inject a first injection amount of water when the intake valve is open in the single cycle; causing the water injection valve to inject a second injection amount of water when the intake valve is closed in the single cycle; and setting a ratio of the first injection amount to a sum of the first injection amount and the second injection amount to a smaller value when the pressure is greater than or equal to a specified value than when the pressure is less than the specified value, the specified value being defined in advance.

Other features and aspects will be apparent from the following detailed description, the drawings, and the claims

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An embodiment of the present disclosure will now be described with reference to the drawings.

Summary of Internal Combustion Engine

Figure 1:
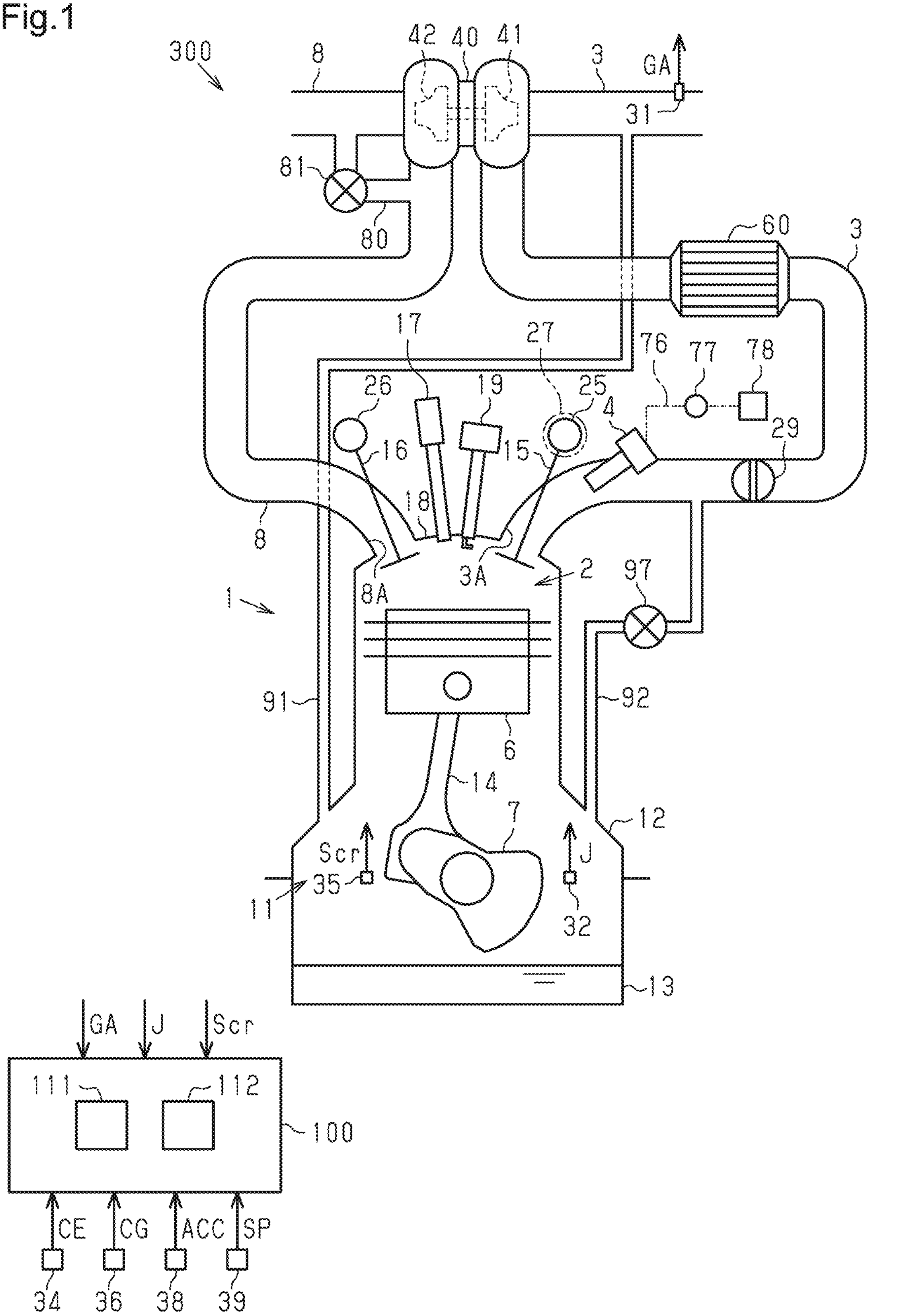
FIG. 1 is a schematic diagram showing the structure of an internal combustion engine.

As shown in FIG. 1, a vehicle 300 includes an internal combustion engine 1. The internal combustion engine 1 is a driving source of the vehicle 300.

The internal combustion engine 1 includes an oil pan 13, a cylinder block 12, and a cylinder head 18. The oil pan 13 stores oil. The cylinder block 12 is located above the oil pan 13. The cylinder head 18 is located above the cylinder block 12.

The internal combustion engine 10 includes cylinders 2, pistons 6, connecting rods 14, a crank chamber 11, and a crankshaft 7. FIG. 1 shows only one of the cylinders 2. The same applies to the pistons 6 and the connecting rods 14. The number of the cylinders 2 is four. Each cylinder 2 is a space defined in the cylinder block 12. In the cylinder 2, the air-fuel mixture of intake air and fuel burns. The crank chamber 11 is located below the cylinder 2. The crank chamber 11 is a space defined by the cylinder block 12 and the oil pan 13. The crank chamber 11 connects to the cylinders 2. The crank chamber 11 accommodates the crankshaft 7. Each piston 6 is disposed in a corresponding cylinder 2. The piston 6 is located in the cylinder 2. The piston 6 reciprocates in the cylinder 2. The piston 6 is coupled to the crankshaft 7 by the connecting rod 14. As the piston 6 operates, the crankshaft 7 rotates.

The internal combustion engine 1 includes ignition plugs 19 and fuel injection valves 17. FIG. 1 shows only one of the ignition plugs 19. The same applies to the fuel injection valves 17. Each ignition plug 19 is disposed in a corresponding cylinder 2. The ignition plug 19 ignites the air-fuel mixture in the cylinder 2. Each fuel injection valve 17 is disposed in a corresponding cylinder 2. The fuel injection valve 17 directly injects fuel into the cylinder 2 without using an intake passage 3, which will be described below.

The internal combustion engine 1 includes the intake passage 3, an intercooler 60, and a throttle valve 29. The intake passage 3 is a passage into which intake air is drawn into each cylinder 2. The intake passage 3 is connected to the cylinders 2. Although not shown in detail in the drawings, the downstream portion of the intake passage 3 has intake ports 3A defined in the cylinder head 18. The intake passage 3 branches into the intake ports 3A at a certain position. FIG. 1 shows only one of the intake ports 3A. Each intake port 3A is disposed in a corresponding cylinder 2. The intake port 3A is connected to the cylinders 2. The throttle valve 29 is located upstream of the intake ports 3A in the intake passage 3. The open degree of the throttle valve 29 can be adjusted. Depending on the open degree of the throttle valve 29, an amount GA of intake air flowing through the intake passage 3 changes. The intercooler 60 is located upstream of the throttle valve 29 in the intake passage 3. The intercooler 60 cools intake air.

The internal combustion engine 1 includes water injection valves 4, a tank 78, a connection passage 76, and a pump 77. FIG. 1 shows only one of the water injection valve 4. Each water injection valve 4 is disposed in a corresponding cylinder 2. Although not shown in detail in the drawings, the tip of each water injection valve 4 is located in a corresponding intake port 3A. The water injection valve 4 injects water into the intake port 3A. The water injected by the water injection valve 4 flows through the intake port 3A into the cylinder 2. The tank 78 stores water. The connection passage 76 connects the tank 78 to each water injection valve 4. The pump 77 forcibly delivers the water from the tank 78 to the water injection valve 4. The pump 77 is, for example, an electric pump that is driven by an electric motor. In the present embodiment, the water injection valve 4 is supplied with water having a fixed set pressure that has been defined in advance.

The internal combustion engine 1 includes an exhaust passage 8. The exhaust passage 8 is a passage out of which exhaust gas is discharged from the cylinders 2. The exhaust passage 8 is connected to the cylinders 2. The upstream portion of the exhaust passage 8 has exhaust ports 8A defined in the cylinder head 18. FIG. 1 shows only one of the exhaust ports 8A.

The internal combustion engine 1 includes a forced-induction device 40. The forced-induction device 40 extends over the intake passage 3 and the exhaust passage 8. The forced-induction device 40 includes a compressor wheel 41 and a turbine wheel 42. The compressor wheel 41 is located upstream of the intercooler 60 in the intake passage 3. The turbine wheel 42 is located in the exhaust passage 8. The turbine wheel 42 rotates as exhaust gas flows. The compressor wheel 41 rotates integrally with the turbine wheel 42. When rotating, the compressor wheel 41 compresses and delivers intake air. That is, intake air is supercharged.

The internal combustion engine 1 includes a bypass passage 80 and a wastegate valve (WGV) 81. The bypass passage 80 connects a portion of the exhaust passage 8 upstream of the turbine wheel 42 to a portion of the exhaust passage 8 downstream of the turbine wheel 42. That is, the bypass passage 80 is a passage that bypasses the turbine wheel 42. The WGV 81 is located at a downstream end of the bypass passage 80. For illustrative purposes, the WGV 81 is located in the bypass passage 80 in FIG. 1. The open degree of the WGV 81 can be adjusted. As the open degree of the WGV 81 becomes smaller than a fully-open degree, the amount of the exhaust gas that passes through the turbine wheel 42 becomes larger. This increases the rotation speeds of the turbine wheel 42 and the compressor wheel 41. As a result, the internal combustion engine 1 enters a supercharged state.

The internal combustion engine 1 includes a blow-by gas processing mechanism that returns blow-by gas in the crank chamber 11 to the intake passage 3. Blow-by gas leaks from the inside of the cylinders 2 into the crank chamber 11 through the gaps between the pistons 6 and the wall surfaces of the cylinders 2. The blow-by gas processing mechanism includes a first passage 91, a second passage 92, and a positive crankcase ventilation (PCV) valve 97. The first passage 91 connects the crank chamber 11 to a portion of the intake passage 3 upstream of the compressor wheel 41. The second passage 92 connects the crank chamber 11 to a portion of the intake passage 3 downstream of the throttle valve 29. The PCV valve 97 is located in the second passage 92. The PCV valve 97 opens when the pressure of intake air flowing on the downstream side of the throttle valve 29 in the intake passage 3 decreases.

For example, when an engine load factor KL is relatively low with the internal combustion engine 1 in a non-supercharged state, the intake pressure on the downstream side of the throttle valve 29 in the intake passage 3 decreases. In this case, the PCV valve 97 opens. Then, the blow-by gas in the crank chamber 11 is discharged to the intake passage 3 through the second passage 92. This causes the intake air in the intake passage 3 to flow into the crank chamber 11 through the first passage 91. For example, when the engine load factor KL is intermediate or relatively high with the internal combustion engine 1 supercharged, the pressure of gas in the crank chamber 11 (hereinafter the crank chamber inner pressure J) is higher than the pressure of the portion of the intake passage 3 upstream of the compressor wheel 41. This causes the blow-by gas in the crank chamber 11 to be discharged to the intake passage 3 through the first passage 91. The definition of the engine load factor KL will be described later. The crank chamber inner pressure J in general is hereinafter simply referred to as the crank chamber inner pressure J. The crank chamber inner pressure J used in real time is hereinafter referred to as the current crank chamber inner pressure J.

The internal combustion engine 1 includes intake valves 15, an intake camshaft 25, and an intake valve timing varying device 27. FIG. 1 shows only one of the intake valves 15. Each intake valve 15 is disposed in a corresponding intake port 3A. The intake port 3A includes a connection port connected to the cylinder 2. The intake valve 15 is located at the connection port of the intake port 3A. The intake valve 15 is coupled to the intake camshaft 25. As the intake camshaft 25 rotates, the intake valve 23 operates to selectively open and close the connection port of the intake port 3A. Rotation of the crankshaft 7 is transmitted to the intake camshaft 25. That is, the intake camshaft 25 rotates in conjunction with the crankshaft 7. The intake valve timing varying device 27 changes the rotation position of the crankshaft 7 relative to the rotation position of the intake camshaft 25 (hereinafter referred to as the crank position Scr). This changes the timing of selectively opening and closing the intake valve 23 relative to the crank position Scr. The intake valve timing varying device 27 is, for example, an electric device that is driven by an electric motor.

The internal combustion engine 1 includes exhaust valves 16, an exhaust camshaft 26, and an exhaust valve timing varying device. FIG. 1 shows only one of the exhaust valve 16. FIG. 1 does not show the exhaust valve timing varying device. Each exhaust valve 16 is disposed in a corresponding exhaust port 8A. The exhaust port 8A includes a connection port connected to the cylinder 2. The exhaust valve 16 is located at the connection port of the exhaust port 8A. The exhaust valve 16 is coupled to the exhaust camshaft 26. As the exhaust camshaft 26 rotates, the exhaust valve 16 operates to selectively open and close the connection port of the exhaust port 8A. Rotation of the crankshaft 7 is transmitted to the exhaust camshaft 26. That is, the exhaust camshaft 26 rotates in conjunction with the crankshaft 7. The exhaust valve timing varying device changes the rotation position of the exhaust camshaft 26 relative to the crank position Scr. This changes the timing of selectively opening and closing the exhaust valve 16 relative to the crank position Scr. The exhaust valve timing varying device is, for example, an electric device that is driven by an electric motor.

The internal combustion engine 1 includes sensors that detect parameters, each indicating the running state of the internal combustion engine 1, such as a crank position sensor 35, an air flow meter 31, and a pressure sensor 32. The sensors of the internal combustion engine 1 for detecting the parameters also include an intake cam position sensor 36 and an exhaust cam position sensor 34. The crank position sensor 35 is located proximate to the crankshaft 7. The crank position sensor 35 detects the crank position Scr. The air flow meter 31 is located upstream of the compressor wheel 41 in the intake passage 3. The air flow meter 31 detects the amount GA of the intake air flowing through the portion of the intake passage 3 where the air flow meter 31 is disposed. The pressure sensor 32 is located in the crank chamber 11. The pressure sensor 32 detects the crank chamber inner pressure J. The intake cam position sensor 36 detects a rotation position CG of the intake camshaft 25. The exhaust cam position sensor 34 detects a rotation position CE of the exhaust camshaft 26. These sensors each repeatedly send a signal corresponding to the detected information to a controller 100 (described later).

The vehicle 300 includes an accelerator sensor 38 and a vehicle speed sensor 39. The accelerator sensor 38 detects an accelerator operation amount ACC, which is the depression amount of the accelerator pedal of the vehicle 300. The vehicle speed sensor 39 detects a vehicle speed SP, which is the travel speed of the vehicle 300. These sensors each repeatedly send a signal corresponding to the detected information to the controller 100 (described later).

Schematic Configuration of Controller

As shown in FIG. 1, the vehicle 300 includes the controller 100. The controller 100 may include processing circuitry including one or more processors that execute various processes in accordance with a computer program (software). The controller 100 may include processing circuitry that includes one or more dedicated hardware circuits such as application specific integrated circuits (ASICs) that execute at least part of various processes or may include processing circuitry that includes a combination of the processors and the dedicated hardware circuits. The processor includes a CPU 111 and a memory 112, such as a RAM or a ROM. The memory 112 stores program codes or instructions configured to cause the CPU 111 to execute the processes. The memory 112, or a computer-readable medium, includes any type of media that are accessible by general-purpose computers and dedicated computers. The memory 112 is an electrically-rewriteable non-volatile memory.

The controller 100 repeatedly receives detection signals from the various sensors of the vehicle 300. Based on the received detection signals, the controller 100 calculates the following parameters when necessary. Based on the crank position Scr detected by the crank position sensor 35, the controller 100 calculates an engine rotation speed NE, which is the rotation speed of the crankshaft 7. Based on the engine rotation speed NE and the amount GA of the intake air detected by the air flow meter 31, the controller 100 calculates the engine load factor KL. The engine load factor KL is the ratio of the current cylinder inflow air amount to a cylinder inflow air amount obtained during steady operation of the internal combustion engine 10 with the throttle valve 29 fully open at the current engine rotation speed NE. The cylinder inflow air amount refers to the amount of the intake air flowing into one cylinder 2 in the intake stroke.

The controller 100 controls the internal combustion engine 1. Based on the accelerator operation amount ACC, the vehicle speed SP, the engine rotation speed NE, the engine load factor KL, and the like, the controller 100 performs various types of control on the internal combustion engine 10 (e.g., fuel injection by the fuel injection valves 17, and the ignition timings of the ignition plugs 19. By performing such control, the controller 100 causes air-fuel mixture to sequentially burn in the cylinders 2. The various types of control include, for example, the adjustment of the open degree of the throttle valve 29 and the adjustment of the WGV 81.

As part of the various control of the internal combustion engine 1, the controller 100 controls the timing of the opening and closing of the intake valves 15 (hereinafter referred to as the intake valve timing) and the timing of the opening and closing of the exhaust valves 16. For example, the controller 100 executes the following control related to the control of the intake valve timing. In the present embodiment, the controller 100 treats, as 0 (initial value), a state in which the intake valve timing is most retarded. By adjusting the advancement amount of the intake valve timing from the initial value, the controller 100 adjusts the intake valve timing. To adjust the intake valve timing, the controller 100 calculates a target advancement amount, which is a target value of the advancement amount of the intake valve timing, based on the engine rotation speed NE, the engine load factor KL, and the like. Then, the controller 100 controls the intake valve timing varying device 27 such that the advancement amount of an actual intake valve timing coincides with the target advancement amount. The controller 100 stores, in advance, the crank position Scr at which the intake valve 23 of each cylinder 2 reaches a valve-opening time TS when the intake valve timing has the initial value. Thus, by calculating a crank position Scr that is advanced from the valve-opening crank position Scr by the target advancement amount, the controller 100 obtains the current crank position Scr at which the intake valve 23 reaches the valve-opening time TS. Likewise, the controller 100 stores, in advance, the crank position Scr at which the intake valve 15 of each cylinder 2 reaches a valve-closing time TC when the intake valve timing has the initial value. This allows the controller 100 to obtain the current crank position Scr at which the intake valve 15 reaches the valve-closing time TC. In such a manner, the controller 100 uses the crank position Scr corresponding to the initial value and the target advancement amount to constantly obtain the crank position Scr at which the intake valve 23 of each cylinder 2 reaches the valve-closing time TS and the crank position Scr at which the intake valve 15 reaches the valve-closing time TC.

Summary of Water Injection Control

Figure 2:
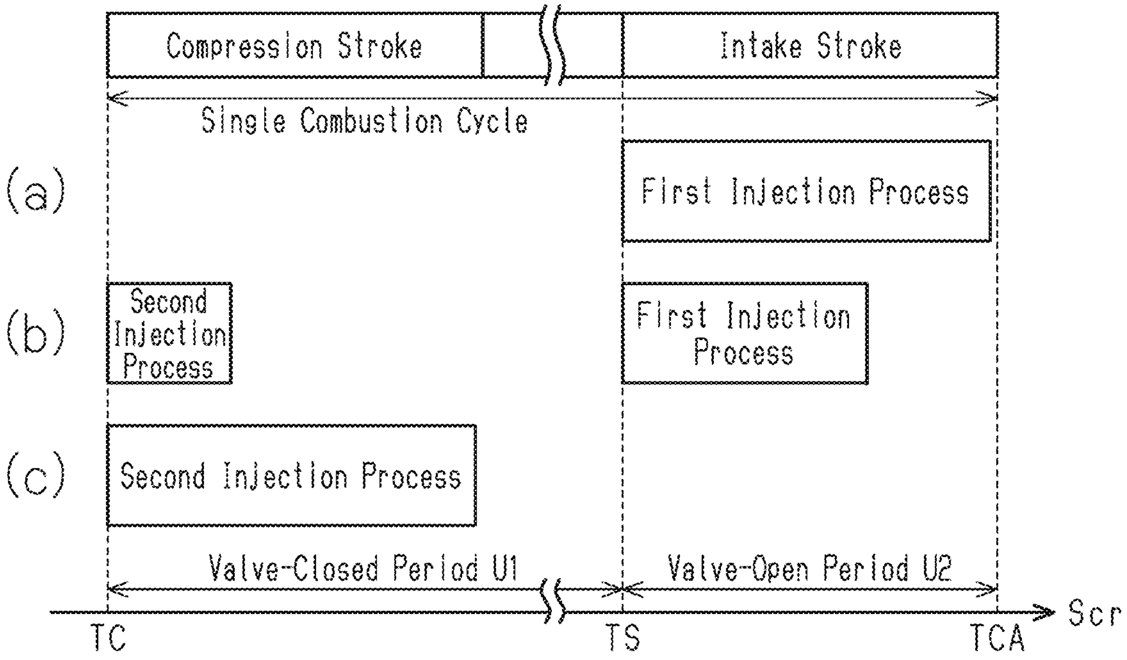
FIG. 2 is a diagram showing how water is injected in the water injection control.

The controller 100 is capable of executing water injection control. The water injection control is executed to control the ignition time and injection amount of the water from each water injection valve 4. In the present embodiment, a single combustion cycle is defined as a period from when the intake valve 15 of a specific cylinder 2 closes to when the intake valve 15 closes again after opening. That is, as shown in FIG. 2, the single combustion cycle is a period from the valve-closing time TC, at which the intake valve 15 closes, to a valve-closing time TCA, at which the intake valve 15 closes again after the elapse of the valve-opening time TS, at which the intake valve 15 opens. In the single combustion cycle, the specific cylinder 2 enters each of the compression stroke, the expansion stroke, the exhaust stroke, and the intake stroke. The period during which the intake valve 15 is closed (i.e., the period from the valve-closing time TC to the valve-opening time TS of the intake valve 15) is hereinafter referred to as a valve-closed period U1 of the intake valve 15. The period during which the intake valve 15 is open (i.e., the period from the valve-opening time TS to the valve-closing time TCA of the intake valve 15) is hereinafter referred to as a valve-open period U2 of the intake valve 15.

As part of the water injection control, the controller 100 can execute a target calculation process. In the target calculation process, the controller 100 uses the running state of the internal combustion engine 1 to calculate a target injection amount Qs. The target injection amount Qs is a target value of the amount of water supplied to one cylinder 2 during the single combustion cycle. The controller 100 stores a target water amount map M1 in advance as the information used to calculate the target injection amount Qs. The target water amount map M1 represents the relationship between the engine rotation speed NE, the engine load factor KL, and a requested water amount. The requested water amount is the amount of water that needs to be supplied to one cylinder 2 in the single combustion cycle. In the target water amount map M1, the engine rotation speed NE, the engine load factor KL, and the requested water amount have the following relationship. When the engine load factor KL is less than a set load factor (described below), the requested water amount is 0 regardless of the engine rotation speed NE is relatively high or low. When the engine load factor KL is greater than or equal to the set load factor (described below), the requested water amount is greater than 0 regardless of the engine rotation speed NE is relatively high or low. Specifically, when the engine load factor KL is greater than or equal to the set load factor, the requested water amount increases as the engine load factor KL increases at a certain engine rotation speed NE. The water injected by the water injection valve 4 evaporates in the cylinder 2. When the water evaporates, the heat of vaporization lowers the temperatures in the cylinder 2. The requested water amount set for the target water amount map M1 has a value that allows for cooling in the cylinder 2 that is requested depending on each running state of the internal combustion engine 1. Further, the set load factor is the lowest value of the engine load factor KL at which the temperature in the cylinder 2 needs to be lowered through the supply of water from the water injection valve 4. The target water amount map M1 is created based on, for example, experiments or simulations.

As part of the water injection control, the controller 100 can execute an injection determination process. In the injection determination process, the controller 100 determines whether the target injection amount Qs of water can be supplied from the water injection valve 4 to the cylinder 2 during the valve-open period U2 of the intake valve 15 in the single combustion cycle. The maximum value of the amount capable of being supplied to one cylinder 2 by injecting water from a corresponding water injection valve 4 during the valve-open period U2 of the intake valve 15 in the single combustion cycle is hereinafter referred to as an allowable injection amount Qv. In the injection determination process, the controller 100 makes the above determination based on whether the target injection amount Qs or the allowable injection amount Qv is larger. The controller 100 stores a reach period L in advance as the information needed to calculate the allowable injection amount Qv. The reach period L is the length of time from when the water injection valve 4 injects water to when the water reaches the inside of the cylinder 2. The reach period L is defined based on, for example, experiments or simulations. In the present embodiment, the reach period L is a fixed value. The controller 100 further stores an injection map M2 in advance as the information needed to calculate the allowable injection amount Qv. The water injection amount obtained when one water injection valve 4 continues to inject water over a certain period is referred to as a possible injection amount. The injection map M2 represents the relationship between the possible injection amount and an injection period during which the water injection valve 4 continues to inject water. In the injection map M2, the possible injection amount becomes larger as the injection period becomes longer. The injection map M2 is created under a prior condition in which the pressure of water supplied to the water injection valve 4 is the set pressure.

As part of the water injection control, the controller 100 can execute a specific injection process. The controller 100 executes the specific injection process when the determination result of the injection determination process is negative. In the specific injection process, the controller 100 causes the water injection valve 4 to inject the target injection amount Qs of water from the valve-closed period U1 to the valve-open period U2 of the intake valve 15 in the single combustion cycle.

As part of the water injection control, the controller 100 can execute a first injection process and a second injection process. The controller 100 executes the first injection process and the second injection process when the determination result of the injection determination process is affirmative. In the first injection process, the controller 100 causes the water injection valve 4 to inject a first injection amount Q1 of water during the valve-open period U2 of the intake valve 15 in the single combustion cycle. In the second injection process, the controller 100 causes the water injection valve 4 to inject a second injection amount Q2 of water during the valve-closed period U1 of the intake valve 15 in the single combustion cycle. The first injection amount Q1 is a target value of the amount of water which the water injection valve 4 injects in the first injection process. The second injection amount Q2 is a target value of the amount of water which the water injection valve 4 injects in the second injection process. The first injection amount Q1 may be 0, which will be described below. In this case, the amount of water which the controller 100 causes the water injection valve 4 to inject in the first injection process is 0. That is, the water injection valve 4 injects no substantial amount of water. Likewise, the second injection amount Q2 may be 0, which will be described below. In this case, the controller 100 causes the water injection valve 4 not to inject any water in the second injection process. That is, the water injection valve 4 does not inject water.

As part of the water injection control, the controller 100 can execute a pressure calculation process. In the pressure calculation process, the controller 100 calculates the current crank chamber inner pressure J based on the running state of the internal combustion engine 1. In the present embodiment, the crank chamber inner pressure J is one of the parameters that indicate the running state of the internal combustion engine 1. The controller 100 calculates the current crank chamber inner pressure J based on the detection value of the pressure sensor 32, which detects the crank chamber inner pressure J.

As part of the water injection control, the controller 100 can execute a first setting process and a second setting process. The controller 100 executes the first setting process before the first injection process. The controller 100 executes the second setting process before the second injection process. In the first setting process, the controller 100 sets the first injection amount Q1 to a value less than or equal to the target injection amount Qs. In the second setting process, the controller 100 sets the second injection amount Q2 to a value of the difference between the target injection amount Qs and the first injection amount Q1. As will be described below, the controller 100 does not always execute the second setting process before the first setting process and may execute the second setting process before the first setting process. In this case, the controller 100 sets the first injection amount Q1 and the second injection amount Q2 such that the sum of the first injection amount Q1 and the second injection amount Q2 is the target injection amount Qs and the first injection amount Q1 is less than or equal to the target injection amount Qs. Thus, even when the controller 100 executes the second setting process before the first setting process, the second injection amount Q2 is consequently the value of the difference between the target injection amount Qs and the first injection amount Q1. That is, regardless of the order of the first and second setting processes, the controller 100 sets the first injection amount Q1 to be less than or equal to the target injection amount Qs and sets the second injection amount Q2 to the value of the difference between the target injection amount Qs and the first injection amount Q1.

The controller 100 changes the method for setting the first injection amount Q1 and the second injection amount Q2 based on whether the current crank chamber inner pressure J is relatively high. The controller 100 stores, in advance, two threshold values serving as a reference for changing the method for setting the first injection amount Q1 and the second injection amount Q2. One of the two threshold values is a first specified value K1. The first specified value K1 is defined in advance as the following crank chamber inner pressure J. As will be described in detail in the Operation section, when water is injected from the water injection valve 4 during the valve-open period U2 of the intake valve 15, the water may reach the inside of the crank chamber 11. When the water evaporates in the crank chamber 11, the crank chamber inner pressure J increases. Although the first specified value K1 permits the crank chamber inner pressure J to further rise in correspondence with the injection of water from the water injection valve 4, the first specified value K1 needs to be treated to prevent the crank chamber inner pressure J from excessively increasing with respect to the current one. The first specified value K1 is defined through, for example, experiments or simulations. The other one of the two threshold values is a second specified value K2. The second specified value K2 is larger than the first specified value K1. The second specified value K2 is defined in advance as the following crank chamber inner pressure J. The second specified value K2 does not permit the crank chamber inner pressure J to further rise in correspondence with the injection of water from the water injection valve 4. The second specified value K2 of the present embodiment indicates an atmospheric pressure. If the internal combustion engine 1 is operated without the injection of water from the water injection valve 4, the crank chamber inner pressure J is negative in most cases. If the water injection valve 4 does not inject water, the crank chamber inner pressure J is greater than or equal to the second specified value K2 under a relatively rare situation in which the crank chamber inner pressure J is relatively close to the upper limit of a possible range during the operation of the internal combustion engine 1.

First Pattern

Depending on whether the current crank chamber inner pressure J is larger than each of the two threshold values, the controller 100 sets the first injection amount Q1 and the second injection amount Q2 to one of the following three patterns.

When the current crank chamber inner pressure J is less than the first specified value K1, the controller 100 sets the first injection amount Q1 and the second injection amount Q2 to a first pattern. The first injection amount Q1 and the second injection amount Q2 in the first pattern are set as follows. The controller 100 sets the first injection amount Q1 to the target injection amount Qs through the first setting process. The controller 100 sets the second injection amount Q2 to 0, which is the difference between the target injection amount Qs and the first injection amount Q1, through the second setting process. When the first pattern is set, the controller 100 causes the water injection valve 4 to inject the target injection amount Qs of water through the first injection process as shown in section (a) of FIG. 2.

Second Pattern

When the current crank chamber inner pressure J is greater than or equal to the first specified value K1 and less than the second specified value K2, the controller 100 sets the first injection amount Q1 and the second injection amount Q2 to a second pattern. The first injection amount Q1 and the second injection amount Q2 in the second pattern are set as follows. The controller 100 sets the first injection amount Q1 to an adjusted injection amount Qa (described below) through the first setting process. The controller 100 sets the second injection amount Q2 to the value obtained by subtracting the first injection amount Q1 from the target injection amount Qs through the setting process. The second injection amount Q2 is a value less than a maximum injection amount Qm, which will be described in a third pattern. When the second pattern is set, the controller 100 causes the water injection valve 4 to inject the target injection amount Qs of water through the first injection process and the second injection process as shown in section (b) of FIG. 2.

The adjusted injection amount Qa is the injection amount of water adjusted such that the crank chamber inner pressure J does not excessively increase. The controller 100 stores an adjustment map M3 in advance as the information needed to calculate the adjusted injection amount Qa. As described above, when the water injected by the water injection valve 4 reaches the inside of the crank chamber 11, the crank chamber inner pressure J increases. As a prior condition for describing the adjustment map M3, the parameter indicating the amount of the crank chamber inner pressure J during water injection is injected will now be described. When a certain amount of water is injected from one water injection valve 4 during the valve-open period U2 of the intake valve 15, the crank chamber inner pressure J may change from the first value to the second value as a response to the water injection. The value obtained by subtracting the first value from the second value is referred to as a pressure change value. There is a time difference from when the water injection valve 4 injects water to when the water reaches the crank chamber 11 and then evaporates. That is, the pressure change value indicates a future change in the crank chamber inner pressure J that occurs when the water injection valve 4 injects water. The adjustment map M3 defines the relationship between the pressure change value and an injection water amount, which is the amount of water injected by one water injection valve 4. The pressure change value changes depending on the flow rate of blow-by gas discharged from the crank chamber 11 to the intake passage 3 through the blow-by gas processing mechanism (hereinafter simply referred to as a blow-by gas release amount). That is, when the blow-by gas is discharged from the crank chamber 11 to the intake passage 3, the crank chamber inner pressure J decreases. The decrease offsets the increase in the crank chamber inner pressure J that occurs when the water injection valve 4 injects water. Specifically, the adjustment map M3 represents the relationship between the injection water amount, the pressure change value, and the blow-by gas release amount with the offset taken into account. In the adjustment map M3, when the blow-by gas release amount is the same, the pressure change value becomes larger as the injection water amount becomes larger. When the blow-by gas release amount is relatively large, the pressure change value is relatively close to 0 even if the injection water amount is relatively large. The adjustment map M3 is created based on, for example, experiments or simulations.

To calculate the first injection amount Q1 in the second pattern, the controller 100 sets, as a pressure difference value ΔJ, the value obtained by subtracting the current crank chamber inner pressure J from the second specified value K2. By applying the pressure difference value ΔJ to the pressure change value of the adjustment map M3, the controller 100 back-calculates the injection water amount corresponding to the pressure difference value ΔJ as a base value of the adjusted injection amount Qa. In the setting of the adjustment map M3, when the blow-by gas release amount is the same, the base value of the adjusted injection amount Qa becomes larger as the pressure difference value ΔJ becomes larger. That is, as the difference between the second specified value K2 and the current crank chamber inner pressure J becomes larger, the controller 100 sets the base value of the adjusted injection amount Qa and consequently the first injection amount Q1 to be larger. In contrast, as the difference between the second specified value K2 and the current crank chamber inner pressure J becomes smaller (i.e., as the current crank chamber inner pressure J is closer to the second specified value K2), the controller 100 sets the first injection amount Q1 to be smaller. When the difference between the second specified value K2 and the current crank chamber inner pressure J is relatively small, it means that the difference between the first specified value K1 and the current crank chamber inner pressure J is relatively large. Accordingly, when calculating the first injection amount Q1 in the second pattern, the controller 100 sets the first injection amount Q1 to be smaller as the difference between the first specified value K1 and the current crank chamber inner pressure J becomes larger in a case in which the blow-by gas release amount is the same.

The relationship between the first injection amount Q1 and the target injection amount Qs set in the second pattern will now be described. The situation of setting the second pattern (i.e., the situation in which the crank chamber inner pressure J is greater than or equal to the first specified value K1 and less than the second specified value K2) is referred to as a predetermined situation. A possible minimum value of the requested water amount set in the target water amount map M1 in an engine running region in which the internal combustion engine 1 is in the predetermined situation is referred to as a minimum requested water amount. The minimum requested water amount is a minimum value of the target injection amount Qs that may be obtained when the internal combustion engine 1 is in the predetermined situation. The maximum value of the blow-by gas release amount in the engine operation in which the internal combustion engine 1 is in the predetermined situation is referred to as a maximum release amount. The blow-by gas release amount is the maximum release amount in the description of the next paragraph. The engine running region is a running region of the internal combustion engine 1 specified by the engine rotation speed NE and the engine load factor KL.

When the internal combustion engine 1 is in the predetermined situation, the pressure difference value ΔJ, which is obtained by subtracting the current crank chamber inner pressure J from the second specified value K2, is the maximum when the current crank chamber inner pressure J is the first specified value K1. Thus, the difference between the second specified value K2 and the first specified value K1 is referred to as a maximum difference. In the adjustment map M3, the injection water amount corresponding to the maximum difference is referred to as a maximum water amount. In the setting of the adjustment map M3, the maximum water amount is the maximum value of the injection water amount that may be obtained when the internal combustion engine 1 is in the predetermined situation. In the setting of the adjustment map M3, the maximum water amount becomes larger as the maximum difference becomes larger (i.e., as the first specified value K1 becomes smaller than the second specified value K2). The first specified value K1 is set such that the maximum water amount is less than the minimum requested water amount. This satisfies the relationship in which the maximum water amount is less than the minimum requested water amount (i.e., the relationship in which the maximum value of the first injection amount Q1 that may be obtained in the predetermined situation is less than the minimum value of the target injection amount Qs that may be obtained in the predetermined situation). In this relationship, the first injection amount Q1 set in the second pattern is always less than the target injection amount Qs.

Since the first injection amount Q1 set in the second pattern is less than the target injection amount Qs, the following situation occurs. The situation of setting the first pattern (i.e., the situation in which the crank chamber inner pressure J is less than the first specified value K1) is referred to as a first situation. The combination of the engine rotation speed NE and the engine load factor KL is referred to as a running point. At the same running point, the internal combustion engine 1 may be in the first situation or the predetermined situation. For example, at the same running point, the evaporation amount of water in the crank chamber 11 may differ when the temperature of oil in the oil pan 13, the temperature in the crank chamber 11, and the like are different. In this case, at the same running point, the internal combustion engine 1 may be in the first situation or the predetermined situation. A case in which the internal combustion engine 1 is in the first situation will now be compared to a case in which the internal combustion engine 1 is in the predetermined situation at the same running point. In these two situations, the target injection amount Qs is the same. In the first situation of setting the first pattern, the controller 100 sets the first injection amount Q1 to the target injection amount Qs. In the predetermined situation of setting the second pattern, the controller 100 sets the first injection amount Q1 to a value smaller than the target injection amount Qs. That is, the controller 100 sets the first injection amount Q1 to a smaller value in the predetermined situation than in the first situation. Thus, when comparison is made at the same running point, the controller 100 sets the first injection amount Q1 to a smaller value in the second pattern than in the first pattern. Accordingly, the controller 100 sets the ratio of the first injection amount Q1 to the sum of the first injection amount Q1 and the second injection amount Q2 to be smaller in the second pattern than in the first pattern.

The first injection amount Q1 set in the second pattern is greater than 0 for the following reason. When the internal combustion engine 1 is in the predetermined situation, the current crank chamber inner pressure J is less than the second specified value K2. That is, when the internal combustion engine 1 is in the predetermined situation, the pressure difference value ΔJ, which is obtained by subtracting the current crank chamber inner pressure J from the second specified value K2, is always greater than 0. When the pressure difference value ΔJ is greater than 0, the first injection amount Q1 obtained by calculating backwards from the pressure difference value ΔJ based on the adjustment map M3 is also greater than 0.

Third Pattern

When the current crank chamber inner pressure J is greater than or equal to the second specified value K2, the controller 100 sets the first injection amount Q1 and the second injection amount Q2 to a third pattern. The first injection amount Q1 and the second injection amount Q2 in the third pattern are set as follows. The controller 100 sets the second injection amount Q2 to the maximum injection amount Qm (described below) through the second setting process. The controller 100 sets the first injection amount Q1 to the value obtained by subtracting the second injection amount Q2 from the target injection amount Qs through the first setting process.

The maximum injection amount Qm is the maximum value of the amount of water in the target injection amount Qs that can be injected by the water injection valve 4 during the valve-closed period U1 of the intake valve 15. In the present embodiment, the controller 100 sets the maximum injection amount Qm to the target injection amount Qs for the following reason. The first injection amount Q1 and the second injection amount Q2 are set to the third pattern in a situation in which the target injection amount Qs is less than or equal to the allowable injection amount Qv. The allowable injection amount Qv is the maximum value of the amount of water that can be injected by the water injection valve 4 during the valve-open period U2 of the intake valve 15. The period during which the intake valve 15 is in the valve-closed period U1 is longer than the period during which the intake valve 15 is in the valve-open period U2. This allows the water injection valve 4 to inject a larger amount of water than the allowable injection amount Qv in the valve-closed period U1 of the intake valve 15. Since the target injection amount Qs is less than or equal to the allowable injection amount Qv as described above, the water injection valve 4 can inject the target injection amount Qs of water in the valve-closed period U1 of the intake valve 15. Because of such a relationship, the maximum injection amount Qm is the target injection amount Qs. Thus, the controller 100 sets the second injection amount Q2 to the target injection amount Qs when using the third pattern. As a result, the controller 100 sets the first injection amount Q1 to 0, which is the difference between the target injection amount Qs and the maximum injection amount Qm, in the third pattern. Accordingly, the first injection amount Q1 of the third pattern is 0 and is thus smaller than the first injection amount Q1 set in the second pattern. Hence, the controller 100 sets the ratio of the first injection amount Q1 to the sum of the first injection amount Q1 and the second injection amount Q2 to be smaller in the third pattern than in the second pattern. Accordingly, the first injection amount Q1 of the third pattern is 0 and is thus a value less than the half of the target injection amount Qs. In the setting of the first injection amount Q1 and the second injection amount Q2, as shown in section (c) of FIG. 2, the controller 100 causes the water injection valve 4 to inject the target injection amount Qs of water through the second injection process when setting the third pattern.

Detailed Processing Procedure of Water Injection Control

The series of processes related to the water injection control described below are executed for one cylinder 2. That is, the controller 100 executes the series of processes related to the water injection control for each cylinder 2 (i.e., each water injection valve 4). When the internal combustion engine 1 is running (i.e., when the engine rotation speed NE is 0), the controller 100 repeatedly executes the water injection control. For each cylinder 2, the controller 100 executes the series of processes related to the water injection control once in the single combustion cycle. The controller 100 starts the water injection control at a start time of the single combustion cycle. As described above, the start time of the single combustion cycle is the valve-closing time TC of the intake valve 15. When the newest crank position Scr received from the crank position sensor 35 coincides with the crank position Scr at which the intake valve 15 reaches the valve-closing time TC, the controller 100 determines that the intake valve 23 has reached the valve-closing time TC. Likewise, when starting the first injection process (described below), the controller 100 refers to the newest crank position Scr to determine that the intake valve 15 has reached the valve-opening time TS. The same applies to the determination of the start time of the specific injection process. Although the details will not be described, the valve-closing time TC and the valve-opening time TS of the intake valve 15 referred to and used by the controller 100 in the series of processes of the water injection control are related to the cylinder 2 for which the water injection control is executed.

Figure 3:
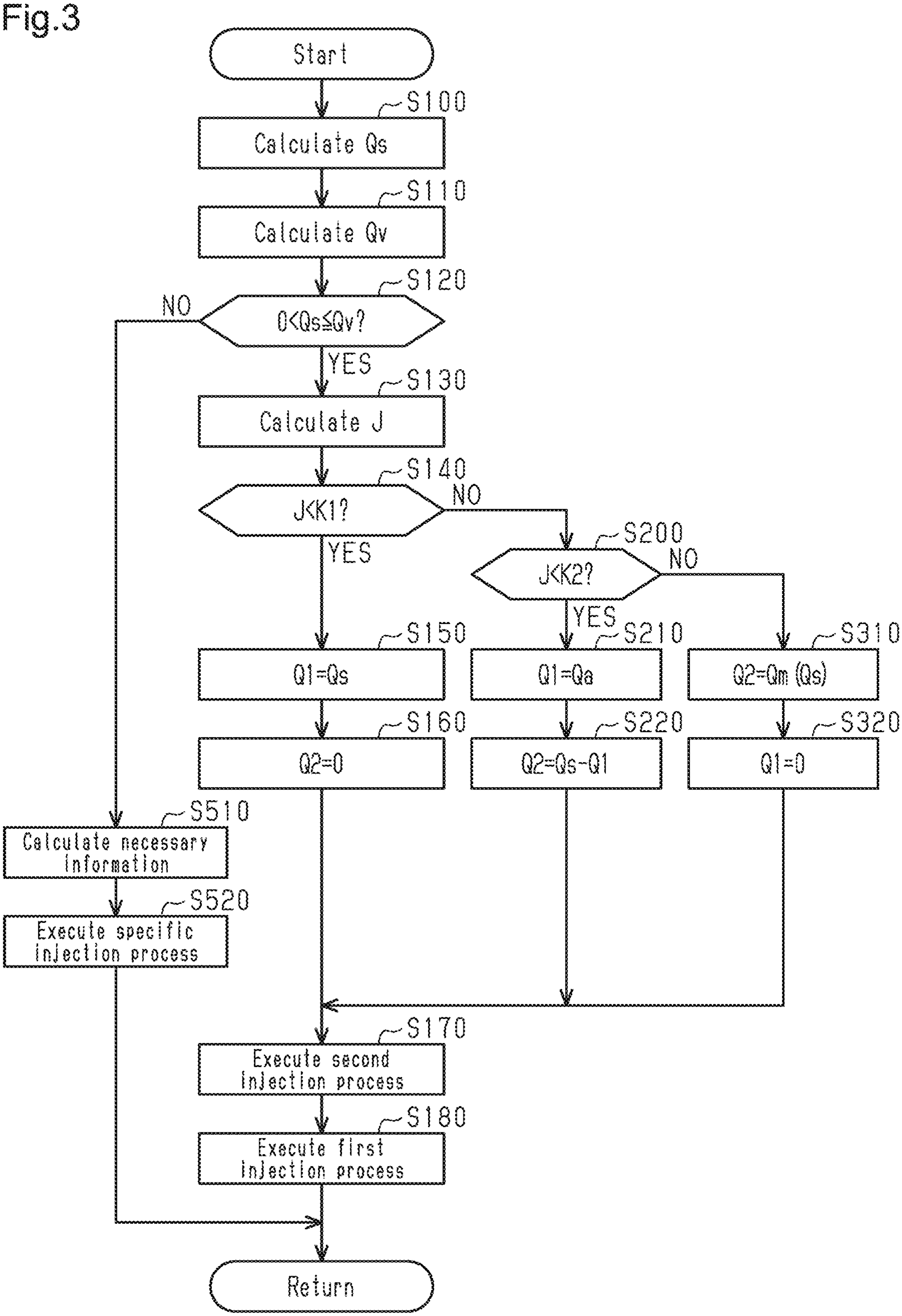
FIG. 3 is a flowchart illustrating a procedure of the water injection control.

As shown in FIG. 3, when starting the water injection control, the controller 100 first executes the process of step S100. In step S100, the controller 100 calculates the target injection amount Qs. Specifically, the controller 100 refers to the newest engine rotation speed NE, the newest engine load factor KL, and the target water amount map M1. As described above, the target water amount map M1 represents the relationship between the engine rotation speed NE, the engine load factor KL, and the requested water amount, which is the amount of water that needs to be supplied to the cylinder 2. Based on the target water amount map M1, the controller 100 calculates, as the target injection amount Qs, the requested water amount corresponding to the newest engine rotation speed NE and the newest engine load factor KL. Subsequently, the controller 100 advances the process to step S110. The process of step S110 is the target calculation process.

In step S110, the controller 100 calculates the allowable injection amount Qv. As described below, the allowable injection amount Qv is the amount of water that can be injected by the water injection valve 4 during a period in the valve-open period U2 of the intake valve 15 excluding the reach period L. The reach period L is the length of time to when the water injected by the water injection valve 4 reaches the inside of the cylinder 2. To calculate the allowable injection amount Qv, the controller 100 first uses the newest engine rotation speed NE to convert the reach period L into a crank rotation amount corresponding to the newest engine rotation speed NE. Then, the controller 100 sets the obtained crank rotation amount as an offset value. The crank rotation amount represents the rotation angle of the crankshaft 7 obtained when the crankshaft 7 rotates from a rotation position to another rotation position. After calculating the offset value, the controller 100 calculates a limit crank position. Specifically, the controller 100 calculates the crank position Scr before, by the offset value, the crank position Scr at which the intake valve 23 reaches the valve-closing time TCA as the limit crank position. As shown in FIG. 2, the valve-closing time TCA is the end time of the current combustion cycle. After calculating the limit crank position, the controller 100 calculates an allowable rotation amount. The allowable rotation amount is a crank rotation amount from the crank position Scr at which the intake valve 15 reaches the valve-opening time TS to the limit crank position. After calculating the allowable rotation amount, the controller 100 uses the newest engine rotation speed NE to convert the allowable rotation amount into the length of time that corresponds to the newest engine rotation speed NE. Then, the controller 100 sets the obtained length of time as an allowable period. Subsequently, the controller 100 refers to the injection map M2. As described above, the injection map M2 represents the relationship between the injection period and the possible injection amount. The controller 100 uses the injection map M2 to calculate, as the allowable injection amount Qv, the possible injection amount corresponding to the allowable period. In this case, the controller 100 only needs to apply the allowable period to the injection period in the injection map M2. As shown in FIG. 3, after calculating the allowable injection amount Qv, the controller 100 advances the process to step S120.

In step S120, the controller 100 determines whether the following specific condition is satisfied. The specific condition is that the target injection amount Qs is greater than 0 and less than or equal to the allowable injection amount Qv. The controller 100 determines whether the specific condition is satisfied by referring to the target injection amount Qs calculated in step S100 and the allowable injection amount Qv calculated in step S110. When determining that the specific condition is not satisfied (step S120: NO), the controller 100 advances the process to step S510. When the process is advanced to step S510, the target injection amount Qs of water cannot be supplied to the cylinder 2 from the water injection valve 4 during the valve-open period U2 of the intake valve 15. As an exception, the determination of step S120 may be NO because the target injection amount Qs is 0. The process of step S120 is the injection determination process.

In step S510, the controller 100 calculates necessary information for the specific injection process, which will be executed later. Specifically, the controller 100 calculates the start time of the specific injection process. First, the controller 100 sets, as a set injection amount, the value obtained by subtracting the allowable injection amount Qv calculated in step S110 from the target injection amount Qs calculated in step S100. Next, the controller 100 refers to the injection map M2. Based on the injection map M2, the controller 100 calculates, as a set injection period, the injection period corresponding to the set injection amount. Subsequently, the controller 100 uses the newest engine rotation speed NE to convert the set injection period into a crank rotation amount corresponding to the newest engine rotation speed NE. Then, the controller 100 sets the obtained crank rotation amount as the set rotation amount. Subsequently, the controller 100 sets the start time of the specific injection process to a crank position Scr that is before, by the set rotation amount, the crank position Scr at which the intake valve 15 reaches the valve-opening time TS. Subsequently, the controller 100 advances the process to step S520. After starting the water injection control, the controller 100 immediately executes the processes of step S100 to S510. Thus, the time at which the process is advanced to the next step S520 is substantially equal to the start time of the single combustion cycle (i.e., the valve-closing time TC of the intake valve 15).

In step S520, the controller 100 executes the specific injection process. Specifically, the controller 100 waits until the start time calculated in step S510. At the start time, the controller 100 starts the specific injection process. That is, the controller 100 causes the water injection valve 4 to inject water. Then, the controller 100 causes the water injection valve 4 to inject water by the target injection amount Qs calculated in step S100. When the injection of the target injection amount Qs of water is completed, the controller 100 temporarily ends the series of processes related to the water injection control. When the start time of the single combustion cycle is reached, the controller 100 executes the process of step S100 again.

In step S120, when determining that the specific condition is satisfied (S120: YES), the controller 100 advances the process of step S130. When the process is advanced to step S130, the target injection amount Qs of water can be supplied to the cylinder 2 from the water injection valve 4 during the valve-open period U2 of the intake valve 15.

In step S130, the controller 100 calculates the current crank chamber inner pressure J. Specifically, the controller 100 refers to the newest crank chamber inner pressure J received from the pressure sensor 32. Then, the controller 100 calculates the referred value as the current crank chamber inner pressure J. Subsequently, the controller 100 advances the process to step S140. The process of step S130 is the pressure calculation process.

In step S140, the controller 100 determines whether the current crank chamber inner pressure J is less than the first specified value K1. When determining that the current crank chamber inner pressure J is less than the first specified value K1 (step S140: YES), the controller 100 advances the process to step S150.

In step S150, the controller 100 calculates the first injection amount Q1. Specifically, the controller 100 sets the first injection amount Q1 to the target injection amount Qs calculated in step S100. Then, the controller 100 advances the process to step S160. The process of step S150 is the first setting process that sets the first pattern.

In step S160, the controller 100 calculates the second injection amount Q2. Specifically, the controller 100 sets the second injection amount Q2 to 0, which is the difference between the target injection amount Qs calculated in step S100 and the first injection amount Q1 set in step S150. Then, the controller 100 advances the process to step S170. The process of step S160 is the second setting process that sets the first pattern. Step S170 and the subsequent step S180 will be described later.

In step S140, when determining that the current crank chamber inner pressure J is greater than or equal to the first specified value K1 (step S140: NO), the controller 100 advances the process to step S200.

In step S200, the controller 100 determines whether the current crank chamber inner pressure J is less than the second specified value K2. When determining that the current crank chamber inner pressure J is less than the second specified value K2 (step S200: YES), the controller 100 advances the process to step S210.

In step S210, the controller 100 sets the first injection amount Q1. To set the first injection amount Q1, the controller 100 first calculates the current blow-by gas release amount. The controller 100 refers to, for example, the newest engine rotation speed NE, the newest engine load factor KL, and the newest amount GA of intake air that has been received from the air flow meter 31. Based on these parameters, the controller 100 calculates the current blow-by gas release amount. To calculate the blow-by gas release amount, for example, the controller 100 refers to a map stored in advance. The map represents the relationship between the blow-by gas release amount and various parameters (e.g., the engine rotation speed NE, the engine load factor KL, and the amount GA of intake air). After calculating the blow-by gas release amount, the controller 100 calculates the pressure difference value ΔJ. Specifically, the controller 100 sets the pressure difference value ΔJ to the value obtained by subtracting, from the second specified value K2, the current crank chamber inner pressure J calculated in step S130. After calculating the pressure difference value ΔJ, the controller 100 refers to the adjustment map M3. As described above, the adjustment map M3 represents the relationship between the injection water amount from one water injection valve 4, the pressure change value corresponding to the injection water amount, and the blow-by gas release amount. Based on the adjustment map M3, the controller 100 calculates, as the base value of the adjusted injection amount Qa, the injection water amount corresponding to the current blow-by gas release amount and the pressure difference value ΔJ. The controller 100 only needs to apply the pressure difference value ΔJ to the pressure change value of the adjustment map M3. After calculating the base value of the adjusted injection amount Qa based on the adjustment map M3, the controller 100 sets one-fourth of the base value as a tentative value. Further, the controller 100 calculates, as the adjusted injection amount Qa, the value obtained by subtracting an adjusted value from the tentative value. The reason for setting one-fourth of the base value as the tentative value of the adjusted injection amount Qa is that the water injection control is performed for each cylinder 2. That is, in the setting of the adjustment map M3, if all the four water injection valves 4 inject water by an amount corresponding to the tentative value of the adjusted injection amount Qa, the crank chamber inner pressure J becomes closer to the second specified value K2. The adjusted value is a correction value used to prevent the crank chamber inner pressure J from reaching the second specified value K2 in correspondence with the injection of water from the water injection valves 4. The adjusted value is an extremely smaller than the tentative value. The adjusted value is, for example, 5% of the tentative value. The ratio of the adjusted value to the tentative value is defined in advance through, for example, experiments or simulations. The controller 100 stores this ratio in advance. After calculating the adjusted injection amount Qa, the controller 100 sets the first injection amount Q1 to the adjusted injection amount Qa. Subsequently, the controller 100 advances the process to step S220. The process of step S210 is the first setting process that sets the second pattern.

In step S220, the controller 100 calculates the second injection amount Q2. Specifically, the controller 100 sets the second injection amount Q2 to the value obtained by subtracting the first injection amount Q1 set in step S210 from the target injection amount Qs calculated in step S100. Then, the controller 100 advances the process to step S170. The process of step S220 is the second setting process that sets the second pattern.

In step S200, when determining that the current crank chamber inner pressure J is greater than or equal to the second specified value K2 (step S200: NO), the controller 100 advances the process to step S310.

In step S310, the controller 100 calculates the second injection amount Q2. Specifically, the controller 100 sets the second injection amount Q2 to the maximum injection amount Qm. The maximum injection amount Qm is the target injection amount Qs calculated in step S100. Subsequently, the controller 100 advances the process to step S320. The process of step S320 is the second setting process that sets the third pattern.

In step S320, the controller 100 sets the first injection amount Q1. Specifically, the controller 100 sets the first injection amount Q1 to 0, which is the difference between the target injection amount Qs calculated in step S100 and the second injection amount Q2 set in step S310. Then, the controller 100 advances the process to step S170. The process of step S320 is the first setting process that sets the third pattern. In the same manner as step S510, after starting the water injection control, the controller 100 immediately executes the processes of step S100 to S320. Thus, the time at which the process is advanced to the next step S170 is substantially equal to the start time of the single combustion cycle (i.e., the valve-closing time TC of the intake valve 15). The same applies to a case in which the process is advanced from step S160 to step S170 and a case in which the process is advanced from step S220 to step S170.

In step S170, the controller 100 immediately executes the second injection process. That is, the controller 100 causes the water injection valve 4 to inject water. In the second injection process, the controller 100 causes the water injection valve 4 to inject the second injection amount Q2 of water calculated in one of step S160, step S220, and step S310. As described above, when the second injection amount Q2 is 0, the controller 100 causes the water injection valve 4 to inject water by an amount corresponding to 0. That is, the water injection valve 4 does not inject water. When the injection of water by the second injection amount Q2 is completed, the controller 100 advances the process to step S180.

In step S180, the controller 100 executes the first injection process. Specifically, the controller 100 waits until the valve-opening time TS of the intake valve 15. When the valve-opening time TS of the intake valve 15 is reached, the controller 100 starts the first injection process. That is, the controller 100 causes the water injection valve 4 to inject water. In the first injection process, the controller 100 causes the water injection valve 4 to inject the first injection amount Q1 of water calculated in one of step S150, step S210, and step S320. When the first injection amount Q1 is 0, the same situation occurs as when the second injection amount Q2 is 0. When the injection of the first injection amount Q1 of water is completed, the controller 100 temporarily ends the series of processes related to the water injection control. When the start time of the single combustion cycle is reached, the controller 100 executes the process of step S100 again.

Operation of Embodiment (A) Influence of Injection Processes on Crank Chamber Inner Pressure In the first injection process, the water injection valve 4 injects water during the valve-open period U2 of the intake valve 15. In this case, the water injected by the water injection valve 4 readily reaches the inside of the cylinder 2 but may have the following problem. When the water injection valve 4 injects water during the valve-open period U2 of the intake valve 15, the momentum of the injection and the flow of intake air cause the water to flow into the cylinder 2 with momentum. This causes the water to readily reach the wall surface of the cylinder block 12, which defines the cylinder 2 (hereinafter referred to as the wall surface of the cylinder 2). When the water that has flowed into the cylinder 2 with momentum collects on a certain portion of the wall surface of the cylinder 2 in a concentrated manner, the water forms a relatively large water droplet. The evaporation of such a relatively large water droplet is limited. Thus, the relatively large water droplet flows down the wall surface of the cylinder 2 and eventually flows into the crank chamber 11. When the water in the crank chamber 11 evaporates in the crank chamber 11, the crank chamber inner pressure J increases.

Unlike the first injection process, the second injection process causes the water injection valve 4 to inject water during the valve-closed period U1 of the intake valve 15. When the water injection valve 4 injects water during the valve-closed period U1 of the intake valve 15, the injected water remains in the intake port 3A instead of immediately flowing into the cylinder 2. After the injection from the water injection valve 4 loses momentum, the water flows into the cylinder 2 as the intake valve 15 opens. Thus, since the injection from the water injection valve 4 has no momentum, the water flows into the cylinder 2 at a lower speed. This limits situations in which the water reaches the wall surface of the cylinder 2. Accordingly, when the second injection process is executed, the flow of water into the crank chamber 11 and an increase in the crank chamber inner pressure J are limited. Still, when the water injection valve 4 injects water during the valve-closed period U1 of the intake valve 15, the following problem may occur. When the water injected by the water injection valve 4 remains in the intake port 3A during a period before the opening of the intake valve 15, the water may collect on the wall surface of the intake port 3A. If this water forms a relatively large water droplet, the evaporation of the water from the wall surface of the intake port 3A is limited. This causes the water that has become a relatively large water droplet to remain in the intake port 3A. As a result, the water injected from the water injection valve 4 cannot be fully supplied to the cylinder 2.

With such behavior of water corresponding to each injection process taken into account, the water injection control selectively uses the two injection processes depending on situations.

(B) Manner of Water Injection with Water Injection Control

When the crank chamber inner pressure J is less than the first specified value K1 (step S140: YES), the controller 100 sets the first injection amount Q1 and the second injection amount Q2 to the first pattern. As described above, the first pattern is a pattern in which the first injection amount Q1 is set to the target injection amount Qs and the second injection amount Q2 is set to 0. Based on the setting of the first pattern, the controller 100 causes the water injection valve 4 to inject the target injection amount Qs of water during the valve-open period U2 of the intake valve 15 through the first injection process as shown in section (a) of FIG. 2. As described above, executing the first injection process increases the crank chamber inner pressure J. Thus, if only the first injection process is repeated (i.e., if the crank chamber inner pressure J remains less than the first specified value K1), the crank chamber inner pressure J may gradually increase. Then, the crank chamber inner pressure J may become greater than or equal to the first specified value K1 (step S140: NO).

When the crank chamber inner pressure J is greater than or equal to the first specified value K1 and less than the second specified value K2 (step S140: NO, step S200: YES), the controller 100 sets the first injection amount Q1 and the second injection amount Q2 to the second pattern. As described above, the second pattern is a pattern in which the first injection amount Q1 is set to the adjusted injection amount Qa and the second injection amount Q2 is set to the difference between the target injection amount Qs and the adjusted injection amount Qa. Based on the setting of the second pattern, the controller 100 divides the water injection performed by the water injection valve 4 into two injections in the combustion cycle as shown in section (b) of FIG. 2. That is, the controller 100 first executes the second injection process during the valve-closed period U1 of the intake valve 15 and then executes the first injection process during the valve-open period U2 of the intake valve 15. The controller 100 executes these two injection processes to cause the water injection valve 4 to inject the target injection amount Qs of water as a total amount in the single combustion cycle. The larger the pressure difference value ΔJ, which is the difference between the second specified value K2 and the current crank chamber inner pressure J, the larger the adjusted injection amount Qa set as the first injection amount Q1 by the controller 100. This means that when there is a considerable margin for the current crank chamber inner pressure J to reach the second specified value K2, the first injection amount Q1 is increased accordingly. This causes the water injection valve 4 to inject as much as water possible during the valve-open period U2 of the intake valve 15, while also preventing an excessive increase in the crank chamber inner pressure J. The water injection by the water injection valve 4 during the valve-open period U2 of the intake valve 15 ensures that a larger amount of water is supplied to the cylinder 2. In the setting of the second pattern, when the pressure difference value ΔJ is relatively small (i.e., when there is no considerable margin for the current crank chamber inner pressure J to reach the second specified value K2), the first injection amount Q1 is reduced. This minimizes the increase amount of the crank chamber inner pressure J corresponding to water injection and prevents the crank chamber inner pressure J from reaching the second specified value K2. The injection process corresponding to the second pattern causes the current crank chamber inner pressure J to fall within a range greater than or equal to the first specified value K1 and less than the second specified value K2. When the current crank chamber inner pressure J remains within the range greater than or equal to the first specified value K1 and less than the second specified value K2, the controller 100 repeats the injection process corresponding to the second pattern.

If, for example, the internal combustion engine 1 is switched between the supercharged state and the non-supercharged state to change the engine load factor KL, a release path for blow-by gas is switched. An abrupt increase in the engine load factor KL may cause the blow-by gas release amount to be temporarily lowered when the release path for blow-by gas is switched. This may cause the crank chamber inner pressure J to increase abruptly. In this case, the crank chamber inner pressure J may be greater than or equal to the second specified value K2 (step S200: NO). When the crank chamber inner pressure J is greater than or equal to the second specified value K2, the controller 100 sets the first injection amount Q1 and the second injection amount Q2 to the third pattern. As described above, the third pattern is a pattern in which the first injection amount Q1 is set to 0 and the second injection amount Q2 is set to the target injection amount Qs. By executing the injection process corresponding to the third pattern, the controller 100 causes the water injection valve 4 to inject the target injection amount Qs of water through the second injection process during the valve-closed period U1 of the intake valve 15 as shown in section (c) of FIG. 2. The injection of water by the water injection valve 4 during the valve-closed period U1 of the intake valve 15 prevents the crank chamber inner pressure J from increasing as described above. This prevents the crank chamber inner pressure J from being sufficiently higher than the second specified value K2 (atmospheric pressure). Eventually, when the switching of the release path for blow-by gas is completed and the blow-by gas release amount recovers, the crank chamber inner pressure J decreases to less than the second specified value K2.

Advantages of Embodiment (1) As described in the Operation section, the controller 100 uses, as a reference, the two threshold values (i.e., the first specified value K1 and the second specified value K2) to set the first injection amount Q1 to be smaller and accordingly sets the second injection amount Q2 to be larger when the current crank chamber inner pressure J is relatively high than when the current crank chamber inner pressure J is relatively low. Thus, when the current crank chamber inner pressure J is relatively high, the characteristics of the first and second injection processes described in (A) of the Operation section reduce the amount of water flowing into the crank chamber 11. This prevents the crank chamber inner pressure J from becoming excessively high.

(2) As described in (A) of the Operation, the first and second injection processes each have advantages and disadvantages corresponding to their characteristics. The controller 100 accordingly changes the method for setting the first injection amount Q1 and the second injection amount Q2 based on whether the crank chamber inner pressure J is relatively high. When the current crank chamber inner pressure J is less than the first specified value K1 (step S140: YES), the controller 100 sets the first injection amount Q1 to the target injection amount Qs. That is, when there is no need to limit an increase in the crank chamber inner pressure J, the controller 100 maximizes the first injection amount Q1 and minimizes the second injection amount Q2. The first injection process is executed to inject water by the total amount of the target injection amount Qs. This allows substantially all the target injection amount Qs of water to be supplied to the cylinder 2. When the current crank chamber inner pressure J is greater than or equal to the first specified value K1 and less than the second specified value K2 (step S140: NO, step S200: YES), the controller 100 sets the first injection amount Q1 to a value less than the target injection amount Qs and greater than 0. That is, when the crank chamber inner pressure J is permitted to further increase but the crank chamber inner pressure J needs to be limited, the controller 100 executes the first and second injection processes to inject the total target injection amount Qs of water. This sufficiently limits an increase in the crank chamber inner pressure J, while also maximizing the amount of water supplied to the cylinder 2. When the current crank chamber inner pressure J is greater than or equal to the second specified value K2 (step S200: NO), the controller 100 sets the first injection amount Q1 to 0. That is, to ensure that an increase in the crank chamber inner pressure J needs to be limited, the controller 100 minimizes the first injection amount Q1 and maximizes the second injection amount Q2. Further, the second injection process is executed to inject water by the total amount of the target injection amount Qs. This prevents the crank chamber inner pressure J from being higher than the current value. In such a manner, the controller 100 changes the first injection amount Q1 and the second injection amount Q2 depending on whether the priority of limiting an increase in the crank chamber inner pressure J is relatively high. Such a configuration of the present embodiment maximizes the amount of water supplied to the cylinder 2 and prevents the crank chamber inner pressure J from increasing.

(3) The situation in which the current crank chamber inner pressure J is greater than or equal to the first specified value K1 and less than the second specified value K2 is a transient situation between the situation in which an increase in the crank chamber inner pressure J does not need to be limited and the situation in which an increase in the crank chamber inner pressure J needs to be limited. Thus, in such a transient situation, the priority as to limiting an increase in the crank chamber inner pressure J differs depending on whether the crank chamber inner pressure J is closer to the first specified value K1 or the second specified value K2. Accordingly, when the current crank chamber inner pressure J is greater than or equal to the first specified value K1 and less than the second specified value K2, the controller 100 variably sets the first injection amount Q1 depending on the pressure difference value ΔJ, which is the difference between the second specified value K2 and the current crank chamber inner pressure J. The controller 100 increases the first injection amount Q1 when the crank chamber inner pressure J is closer to the first specified value K1 and decreases the first injection amount Q1 when the crank chamber inner pressure J is closer to the second specified value K2. In such a manner, the first injection amount Q1 is variably set. This allows a value optimal for the current crank chamber inner pressure J to be set in order to supply water to the cylinder 2 and limit an increase in the crank chamber inner pressure J under the transient situation.

(4) The crank chamber inner pressure J is negative. The internal combustion engine 1 includes a seal used to keep the crank chamber 11 airtight. The seal is, for example, an oil seal that blocks the gap of the cylinder block 12 or the like between the crankshaft 7 and a through-hole that extends through the crankshaft 7. The components of the crank chamber 11, including the seal, are designed based on the crank chamber inner pressure J being a negative pressure or a small positive pressure. Accordingly, when the crank chamber inner pressure J is sufficiently larger than the atmospheric pressure, the components may fail to function properly.

In the present embodiment, the second specified value K2 is set to the atmospheric pressure. When the current crank chamber inner pressure J is greater than or equal to the atmospheric pressure, the first injection amount Q1 is set to 0. Thus, even if the current crank chamber inner pressure J is greater than or equal to the atmospheric pressure, the current crank chamber inner pressure J is prevented from further increasing. This allows the current crank chamber inner pressure J to fall within a range in which the components of the internal combustion engine 1 function properly.

Modifications

The above embodiment may be modified as follows. The above embodiment and the following modifications can be combined as long as the combined modifications remain technically consistent with each other.

The injection start time of the second injection process is not limited to the example of the above embodiment. The start time of the second injection process only needs to be a time which is included in the valve-closing period U1 of the intake valve 15 in the single combustion cycle and which allows the second injection amount Q2 of water to be fully injected from the water injection valve 4 during the valve-closing period U1 of the intake valve 15. For example, the second injection process may be started after the valve-closing time TC of the intake valve 15. The start time of the second injection process only needs to satisfy the above condition.

The start time of the first injection process is not limited to the example of the above embodiment. The start time of the first injection process only needs to be a time which is included in the valve-opening period U2 of the intake valve 15 in the single combustion cycle and which allows the first injection amount Q1 of water to be fully injected from the water injection valve 4 during the valve-opening period U2 of the intake valve 15.

The maximum injection amount Qm set in the third pattern is not limited to the example of the above embodiment. In the above embodiment, the execution of the second injection process is permitted over the entire valve-closing period U1 of the intake valve 15. As a result, the maximum injection amount Qm is constantly the target injection amount Qs. Due to restraints or the like on control, the execution of the second injection process may not be permitted over the entire valve-closing period U1 of the intake valve 15. In addition, the maximum injection amount Qm may be less than the target injection amount Qs. When the maximum injection amount Qm is less than the target injection amount Qs and is set to the second injection amount Q2, the first injection amount Q1, which is the difference between the target injection amount Qs and the second injection amount Q2, is greater than 0.

The second injection amount Q2 set in the third pattern may be less than the maximum injection amount Qm. The second injection amount Q2 only needs to be set such that the first injection amount Q1 set in the third pattern is smaller than the first injection amount Q1 set in the second pattern.

The second injection amount Q2 set in the third pattern may be less than the half of the target injection amount Qs. Further, the first injection amount Q1 set in the third pattern may be greater than or equal to the half of the target injection amount Qs. In this case, the first injection amount Q1 set in the third pattern only needs to be smaller than the first injection amount Q1 set in the second pattern.

Of the first injection amount Q1 and the second injection amount Q2 set in the third pattern, the second injection amount Q2 does not have to be set in advance. Of the first injection amount Q1 and the second injection amount Q2, the first injection amount Q1 may be set in advance. Instead, these amounts may be set simultaneously. Regardless of the order of setting the first injection amount Q1 and the second injection amount Q2, the first injection amount Q1 set in the third pattern only needs to be smaller than the first injection amount Q1 set in the second pattern.

The method for defining the first injection amount Q1 set in the second pattern is not limited to the example of the above embodiment. The first injection amount Q1 set in the second pattern only needs to be smaller than the first injection amount Q1 set in the first pattern. To set the first injection amount Q1 in the second pattern, it is preferred from the following perspective that the first injection amount Q1 be variably set such that the first injection amount Q1 becomes smaller as the difference between the first specified value K1 and the current crank chamber inner pressure J becomes larger. In this configuration, the first injection amount Q1 can be readily set based on the current crank chamber inner pressure J such that water is supplied to the cylinder 2 and an increase in the crank chamber inner pressure J is limited. Regardless of whether the difference between the first specified value K1 and the current crank chamber inner pressure J is relatively large, the first injection amount Q1 set in the second pattern may be a fixed value that always remains the same.

The first injection amount Q1 set in the second pattern may be less than the half of the target injection amount Qs. In this case, the first injection amount Q1 set in the second pattern only needs to be smaller than the first injection amount Q1 set in the first pattern.

Of the first injection amount Q1 and the second injection amount Q2 set in the second pattern, the first injection amount Q1 does not have to be set in advance. Of the first injection amount Q1 and the second injection amount Q2, the second injection amount Q2 may be set in advance. Instead, these amounts may be set simultaneously. Regardless of the order of setting the first injection amount Q1 and the second injection amount Q2, the first injection amount Q1 set in the second pattern only needs to be smaller than the first injection amount Q1 set in the first pattern.

The first injection amount Q1 set in the first pattern is not limited to the example of the above embodiment. That is, the first injection amount Q1 set in the first pattern may be less than the target injection amount Qs. As described above, the relationship in which the first injection amount Q1 becomes smaller in the order of the first pattern, the second pattern, and the third pattern only needs to be satisfied.

The first injection amount Q1 and the second injection amount Q2 may be set in the first pattern in any order in the same manner as the other patterns.

The second specified value K2 is not limited to the example in the above embodiment. Each of the first injection amount Q1 and the second injection amount Q2 set in the third pattern only needs to be set to a proper value in correspondence with the second specified value K2. The second specified value K2 only needs to be larger than the first specified value K1.

In the water injection control, the processes of step S200, step S310, and step S320 may be omitted. When the determination of step S140 is NO, the process may be advanced to step S210. That is, the method for setting the first injection amount Q1 and the second injection amount Q2 may be a method for only making a single change with the first specified value K1. In this case, the first injection amount Q1 set in the second pattern only needs to be smaller than the first injection amount Q1 set in the first pattern.

The first specified value K1 is not limited to the example in the above embodiment. The first specified value K1 only needs to be suitable for the method for setting the first injection amount Q1 and the second injection amount Q2.

Even if the method for setting the first injection amount Q1 and the second injection amount Q2 is changed from that of the above embodiment, the first injection amount Q1 and the second injection amount Q2 preferably satisfy the condition that the first injection amount Q1 is less than or equal to the target injection amount Qs and the condition that the second injection amount Q2 is the difference between the target injection amount Qs and the first injection amount Q1. When these conditions are satisfied, the second injection amount Q2 only needs to be consequently the value of the difference between the target injection amount Qs and the first injection amount Q1 regardless of the order of setting the first injection amount Q1 and the second injection amount Q2. Additionally, for example, when setting the second injection amount Q2 in the second pattern, the above embodiment calculates the second injection amount Q2 by subtracting the first injection amount Q1 from the target injection amount Qs. The method for defining the first injection amount Q1 and the second injection amount Q2 is not limited to that using such subtraction. If the first injection amount Q1 is less than or equal to the target injection amount Qs and the second injection amount Q2 is the difference between the target injection amount Qs and the first injection amount Q1, any calculation method may be used. The target injection amount Qs does not have to be the sum of the first injection amount Q1 and the second injection amount Q2. Even if the target injection amount Qs is not the sum of the first injection amount Q1 and the second injection amount Q2, the following relationship only needs to be satisfied. The ratio of the first injection amount Q1 to the sum of the first injection amount Q1 and the second injection amount Q2 is smaller in the second pattern than in the first pattern. When the third pattern is employed, the ratio of the first injection amount Q1 to the sum of the first injection amount Q1 and the second injection amount Q2 is smaller in the third pattern than in the second pattern. To set the first injection amount Q1 and the second injection amount Q2 such that these relationships are satisfied, the first injection amount Q1 and the second injection amount Q2 may be 0.

The method for calculating the current crank chamber inner pressure J is not limited to the example of the above embodiment. The current crank chamber inner pressure J is calculated based on the running state of the internal combustion engine 1. In the above embodiment, the crank chamber inner pressure J, which is one of the parameters indicating the running state of the internal combustion engine 1, is directly detected and the current crank chamber inner pressure J is calculated from that detection value. Instead, the current crank chamber inner pressure J may be calculated based on parameters other than the crank chamber inner pressure J. These parameters only need to be related to the crank chamber inner pressure J and indicate the running state of the internal combustion engine 1. For example, the current crank chamber inner pressure J may be calculated based on the engine rotation speed NE and the engine load factor KL. In this case, for example, a map only needs to be created in advance to represent the relationship between the engine rotation speed NE, the engine load factor KL, and the crank chamber inner pressure J. The parameters related to the crank chamber inner pressure J and the running state of the internal combustion engine 1 are not limited to the engine rotation speed NE or the engine load factor KL. Instead, the parameters may include the amount GA of intake air, the pressure of intake air flowing through the intake passage 3, the gas flowing through each passage of the blow-by gas processing mechanism, and the like. These parameters may be used to calculate the crank chamber inner pressure J. When the pressure of the intake air flowing through the intake passage 3 is used, an intake pressure sensor that detects the pressure of intake air is disposed in the intake passage 3. When the pressure of the gas flowing through the passages of the blow-by gas processing mechanism is used, sensors each detecting the gas flowing through a corresponding passage are disposed in the passage. The crank chamber inner pressure J relates to the temperature in the crank chamber 11. Thus, the use of a parameter related to the temperature of the crank chamber 11 is effective for calculating the current crank chamber inner pressure J. In this case, in addition to the temperature in the crank chamber 11, the temperature of oil stored in the oil pan 13 and the temperature of coolant flowing through the cylinder block 12 may also be used. When the current crank chamber inner pressure J is calculated using these parameters, sensors are each disposed at a position suitable for detecting a corresponding parameter. As another option, the current crank chamber inner pressure J may be calculated based on the running state of the internal combustion engine 1 using a parameter that can be obtained without using a sensor. Such a parameter is, for example, the duration from when the internal combustion engine 1 starts running.

The content of the target water amount map M1 is not limited to the example in the above embodiment. The target water amount map M1 only needs to be set depending on the running state of the internal combustion engine 1 to inject water needed to cool the inside of the cylinder 2 by a necessary amount.

The reach period L is not limited to a fixed value and may be variably set depending on, for example, the amount GA of intake air. The reach period L may be 0. In this case, almost the target injection amount Qs of water reaches the inside of each cylinder 2.

When the internal combustion engine 1 is running, the pressure of water supplied to the water injection valve 4 may be changed depending on the running state of the internal combustion engine 1. In this case, various maps or the like are created to correctly control the water injection valve 4 based on the change in the pressure of water. For example, the injection map M2 defines the relationship between the injection period and the possible injection amount for each pressure of water supplied to the water injection valve 4. Such an injection map M2 allows the allowable injection amount Qv to be calculated based on the pressure of water supplied to the water injection valve 4.

The method for obtaining the crank position Scr at which the intake valve 15 reaches the valve-opening time TS is not limited to the example in the above embodiment. For example, detection values of the crank position sensor 35 and the intake cam position sensor 36 may be used to obtain the crank position Scr at which the intake valve 15 reaches the valve-opening time TS. If the crank position Scr at which the intake valve 15 reaches the valve-opening time TS can be correctly obtained, any method may be employed. The same applies to the crank position Scr at which the intake valve 15 reaches the valve-closing time TC.

The overall configuration of the internal combustion engine 1 is not limited to the example of the above embodiment. The number of the cylinders 2 may be changed. Further, the structure of the blow-by gas processing mechanism may be changed. In addition to the components of the above embodiment, the blow-by gas processing mechanism may include, for example, a third passage, an intake air bypass passage, and an ejector. The intake air bypass passage connects the portion of the intake passage 3 upstream of the compressor wheel 41 to the portion of the intake passage 3 downstream of the compressor wheel 41. That is, the intake air bypass passage is a passage that bypasses the compressor wheel 41. The ejector is disposed in the intake air bypass passage. The ejector includes a constriction that generates a negative pressure. The third passage connects the crank chamber 11 to the ejector. In the structure in which these components are added, when the internal combustion engine 1 enters the supercharged state, some of the intake air returns from the downstream side to the upstream side of the compressor wheel 41 through the intake air bypass passage in correspondence with the pressures of the intake air at the portions upstream and downstream of the compressor wheel 41. In this case, the ejector, which is located in the intake air bypass passage, generates a negative pressure. The ejector suctions blow-by gas from the crank chamber 11 through the third passage. The blow-by gas flows through the intake air bypass passage to the intake passage 3. Such a blow-by gas processing mechanism may be employed. The internal combustion engine 1 does not have to include the forced-induction device 40. The internal combustion engine 1 only needs to include the water injection valves 4, the crank chamber 11, and the intake valve 15.

The overall configuration of the vehicle 300 is not limited to the example of the above embodiment. For example, the vehicle 300 may include a motor generator as the driving source of the vehicle 300, in addition to the internal combustion engine 1.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for an internal combustion engine, the internal combustion engine including:

a cylinder;

an intake passage including a connection port connected to the cylinder;

a water injection valve configured to inject water into the intake passage;

an intake valve configured to selectively open and close the connection port; and a crank chamber connected to the cylinder and that accommodates a crankshaft, wherein the controller comprises processing circuitry configured to execute:

a pressure calculation process that calculates a pressure of a gas in the crank chamber based on a running state of the internal combustion engine;

a first injection process that causes the water injection valve to inject a first injection amount of water into the intake passage when the intake valve is open in a single combustion cycle; and a second injection process that causes the water injection valve to inject a second injection amount of water into the intake passage when the intake valve is closed in the single combustion cycle, and the processing circuitry is configured to set a ratio of the first injection amount of water to a sum of the first injection amount of water and the second injection amount of water to a smaller value when the pressure of the gas in the crank chamber is greater than or equal to a specified value than when the pressure of the gas in the crank chamber is less than the specified value, the specified value being defined in advance.

2. The controller according to claim 1, wherein the processing circuitry is configured to execute:

a target calculation process that calculates a target injection amount of water based on the running state of the internal combustion engine, the target injection amount of water being a target value of an amount of water to be supplied to the cylinder in the single combustion cycle;

a first setting process that sets the first injection amount of water to a value less than or equal to the target injection amount of water; and a second setting process that sets the second injection amount of water to a value of a difference between the target injection amount of water and the first injection amount of water, and the processing circuitry is configured to set the first injection amount of water to a smaller value in the first setting process when the pressure of the gas in the crank chamber is greater than or equal to the specified value than when the pressure of the gas in the crank chamber is less than the specified value.

3. The controller according to claim 2, wherein the processing circuitry is configured to set the first injection amount of water to a value less than a half of the target injection amount of water in the first setting process when the pressure of the gas in the crank chamber is greater than or equal to the specified value.

4. The controller according to claim 2, wherein the specified value is a first specified value, and the processing circuitry is configured to set the first injection amount of water to a smaller value in the first setting process when the pressure of the gas in the crank chamber is greater than or equal to a second specified value than when the pressure of the gas in the crank chamber is greater than or equal to the first specified value and less than the second specified value, the second specified value being greater than the first specified value.

5. The controller according to claim 4, wherein the processing circuitry is configured to set the second injection amount of water to a maximum injection amount of water in the second setting process when the pressure of the gas in the crank chamber is greater than or equal to the second specified value, the maximum injection amount of water being a maximum value of an amount of water in the target injection amount of water capable of being injected from the water injection valve when the intake valve is closed, and the processing circuitry is configured to:

when the pressure of the gas in the crank chamber is greater than or equal to the first specified value and less than the second specified value, set the second injection amount of water to be smaller than the maximum injection amount of water in the second setting process; and set the first injection amount of water to be smaller as a difference between the first specified value and the pressure of the gas in the crank chamber becomes larger in the first setting process.

6. The controller according to claim 4, wherein the second specified value indicates an atmospheric pressure.

7. A control method for an internal combustion engine, the internal combustion engine including:

a cylinder;

an intake passage including a connection port connected to the cylinder;

a water injection valve configured to inject water into the intake passage;

an intake valve configured to selectively open and close the connection port; and a crank chamber connected to the cylinder and that accommodates a crankshaft, wherein the control method comprises:

calculating a pressure of a gas in the crank chamber based on a running state of the internal combustion engine;

causing the water injection valve to inject a first injection amount of water into the intake passage when the intake valve is open in a single combustion cycle;

causing the water injection valve to inject a second injection amount of water into the intake passage when the intake valve is closed in the single combustion cycle; and setting a ratio of the first injection amount of water to a sum of the first injection amount of water and the second injection amount of water to a smaller value when the pressure of the gas in the crank chamber is greater than or equal to a specified value than when the pressure of the gas in the crank chamber is less than the specified value, the specified value being defined in advance.

* * * * *